US 12,400,447 B2

(12) United States Patent
Wang et al.

(10) Patent No.: US 12,400,447 B2
(45) Date of Patent: Aug. 26, 2025

(54) IMAGE PROCESSING METHOD ACCORDING TO CADENCE OF IMAGE FRAMES AND DEVICE OR PERFORMING THE SAME

(71) Applicant: REALTEK SEMICONDUCTOR CORPORATION, Hsinchu (TW)

(72) Inventors: Jhih-Jie Wang, Hsinchu (TW); Chih-Shun Fan Chiang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 472 days.

(21) Appl. No.: 17/539,123

(22) Filed: Nov. 30, 2021

(65) Prior Publication Data
US 2023/0009556 A1  Jan. 12, 2023

(30) Foreign Application Priority Data
Jul. 7, 2021  (TW) ................. 110124999

(51) Int. Cl.
*G06F 1/03* (2006.01)
*G06V 10/60* (2022.01)
*G06V 20/40* (2022.01)
*G06V 20/62* (2022.01)

(52) U.S. Cl.
CPC ............... *G06V 20/46* (2022.01); *G06F 1/03* (2013.01); *G06V 10/60* (2022.01); *G06V 20/62* (2022.01)

(58) Field of Classification Search
None
See application file for complete search history.

(56) References Cited

U.S. PATENT DOCUMENTS

| 8,300,145 | B2 | 10/2012 | Wu et al. | |
|---|---|---|---|---|
| 2007/0223574 | A1* | 9/2007 | Roman | H04N 21/4854 375/E7.2 |
| 2010/0177239 | A1 | 7/2010 | Servais et al. | |
| 2015/0348509 | A1 | 12/2015 | Verbeure et al. | |
| 2017/0180645 | A1* | 6/2017 | Weckel | H04N 23/683 |
| 2021/0141449 | A1* | 5/2021 | Zhang | G06F 3/013 |
| 2023/0123545 | A1* | 4/2023 | Ahsan | H04N 21/8543 386/355 |

* cited by examiner

*Primary Examiner* — Idowu O Osifade
(74) *Attorney, Agent, or Firm* — WPAT, P.C.; Anthony King

(57) ABSTRACT

An image processing method includes: detecting repetition numbers of each image frame of an input image frame sequence, wherein the input image frame sequence includes sequentially inputted at least one first image frame and at least one second image frame, and image data of each first image frame is different from image data of each second image frame; determining a first lookup table according to a first repetition numbers of the at least one first image frame, wherein the first lookup table indicates a plurality of sets of compensation calculations; and using a first set of compensation calculations in the sets of compensation calculations to process the at least one first image frame according to a second repetition numbers of the at least one second image frame.

16 Claims, 5 Drawing Sheets

IMAGE PROCESSING METHOD ACCORDING TO CADENCE OF IMAGE FRAMES AND DEVICE OR PERFORMING THE SAME

CROSS-REFERENCE TO RELATED APPLICATIONS

This application claims the benefit of priority to Patent Application No. 110124999, filed in Taiwan on Jul. 7, 2021, which is incorporated by reference in its entirety

TECHNICAL FIELD

The present application relates to an image processing device and method; in particular, to an image processing device and method for processing the cadence.

BACKGROUND

When the cadence of the image signal is fixed, the display system can adjust the image data of at least some frames of the image signal corresponding to the cadence, and then output the adjusted image signal to achieve a better viewing quality. However, when the cadence of the image signal changes, the display system cannot adjust the image data in a timely manner to match the changed cadence, and hence the output image signal may produce jams or skipped frames, which may reduce the viewing quality. Therefore, to reduce the problems arising from the change of cadence has become one of the most important issues in this field.

SUMMARY OF THE INVENTION

Some embodiments of the present disclosure provide an image processing method, including the steps of: detecting repetition numbers of each image frame of an input image frame sequence, wherein the input image frame sequence comprises sequentially inputted at least one first image frame and at least one second image frame, and an image data of each first image frame differs from an image data of each second image frame; determining a first lookup table according to a first repetition number of the at least one first image frame, wherein the first lookup table indicates a plurality of sets of compensation calculations; and using a first set of compensation calculations in the plurality of sets of compensation calculations to process the image data of the at least one first image frame according to a second repetition number of the at least one second image frame.

Some embodiments of the present disclosure provide an image processing device, including a detector and a data processor. The detector is configured to detect repetition numbers of each image frame of an input image frame sequence. The input image frame sequence comprises sequentially inputted at least one first image frame and at least one second image frame, and an image data of each first image frame differs from an image data of each second image frame. The data processor is configured to determine a first lookup table according to a first repetition number of the at least one first image frame. The first lookup table indicates a plurality of sets of compensation calculations; and the data processor is further configured to use a first set of compensation calculations in the plurality of sets of compensation calculations to process the image data of the at least one first image frame according to a second repetition number of the at least one second image frame.

Compared with the prior art, the image processing device and method of the present invention sequentially detects the repetition numbers of each frame of the received image signal and adjusts the image data of those frames according to the detected repetition numbers, so as to improve the smoothness of the output image and enhance the viewing quality.

DETAILED DESCRIPTION

Figure 1:
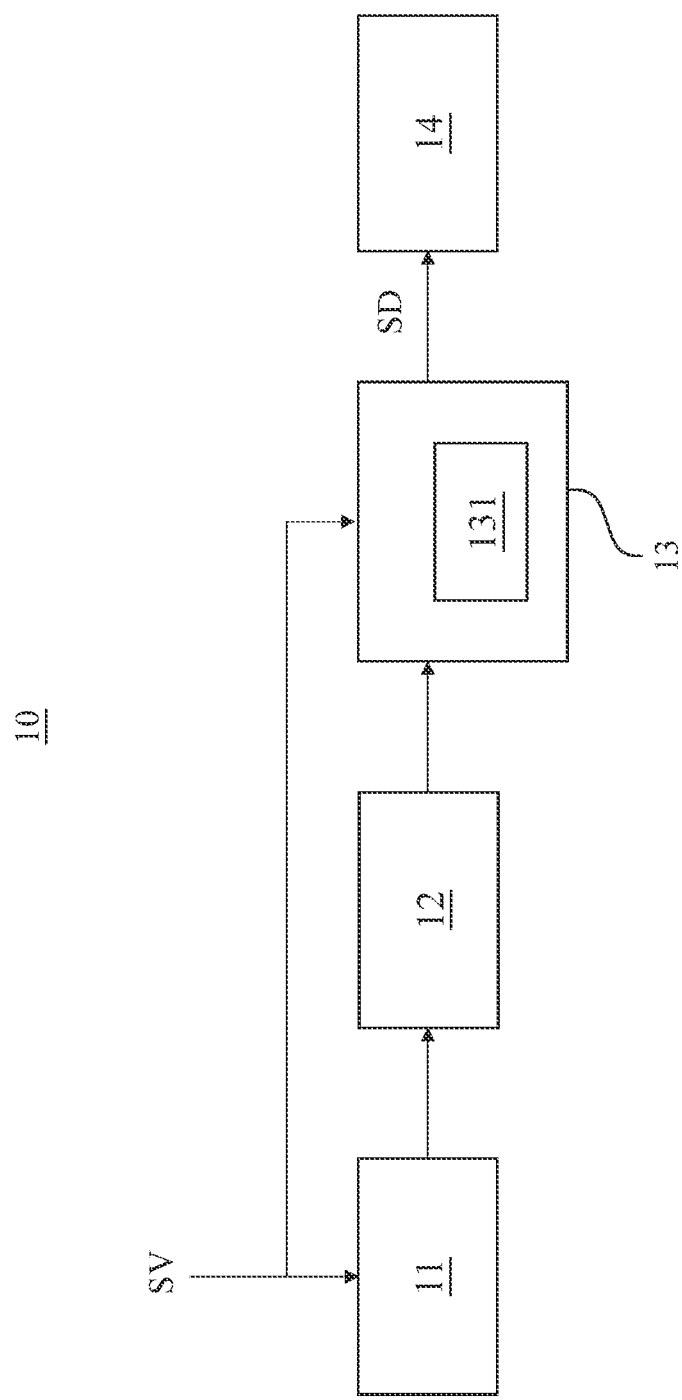
FIG. 1 is a schematic diagram illustrating an image processing device according to some embodiments of the present disclosure.

FIG. 1 is a schematic diagram illustrating an image processing device 10 according to some embodiments of the present disclosure. The image processing device 10 includes a detector 11, a register 12, a data processor 13, and a display 14. The image processing device 10 is configured to receive an image signal SV and adjust the image signal SV according to repetition numbers of image frames in the image signal SV to generate a display signal SD, and then the display 14 is configured to display the display signal SD.

Figure 2:
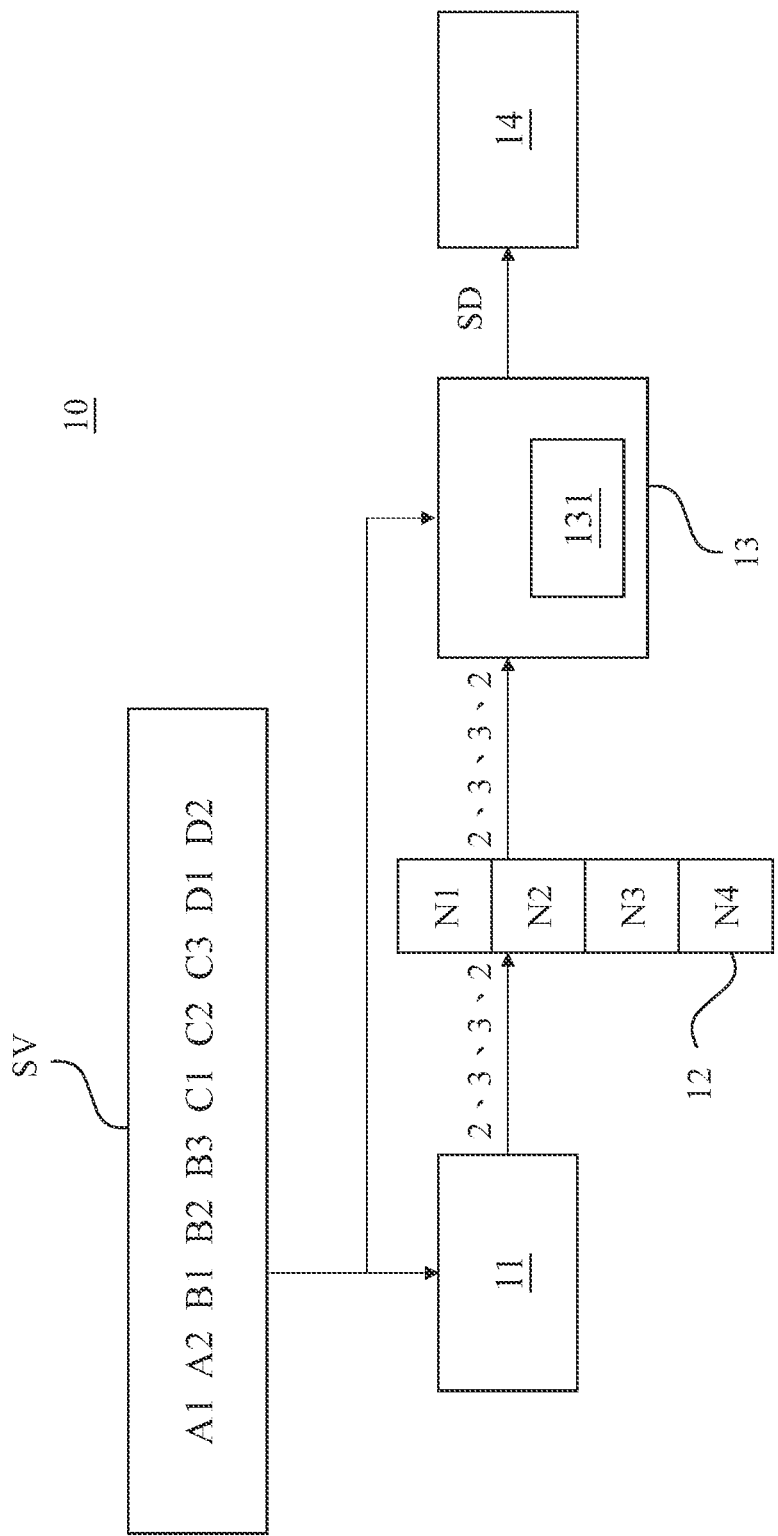
FIG. 2 is a schematic diagram illustrating an image processing device according to other embodiments of the present disclosure.

The image signal SV includes a plurality of image frames that are sequentially inputted. In other words, the image signal SV includes an input image frame sequence. The input image frame sequence includes a plurality sets of repetition image frames. For example, as shown in FIG. 2, the input image frame sequence includes, in the order of, an image frame A1, an image frame A2, an image frame B1, an image frame B2, an image frame B3, an image frame C1, an image frame C2, an image frame C3, an image frame D1, and an image frame D2 (for the ease of discussion, referred to hereinbelow as A1, A2, B1, B2, B3, C1, C2, C3, D1, and D2, respectively), wherein A1 and A2 have the same image data. Similarly, B1~B3, C1~C3, and D1~D2 also have respective the same image data. The input image frame sequence shown in FIG. 2 is illustrative, and the present disclosure is not limited thereto; the input image frame sequence can be a plurality of image frames including various repetition numbers.

The detector 11 is configured to receive the input image frame sequence to detect repetition numbers of the plurality of image frames having the same image data and write the detected number into the register 12. Take FIG. 2 for example, the detector 11 detects that the image frame that is inputted in a row with A1 and has the same image data as A1 is A2. There are two repetitions (A1 and A2) with the same image data, and hence the detector 11 detects that a number corresponding to A1 and A2 is 2 and writes the number 2 into the register 12. Similarly, the detector 11 respectively writes the numbers 3, 3, 2 into the register 12, corresponding to B1~B3, C1~C3, and D1~D2.

In some embodiments, the detector 11 is configured to measure an average luminance of each image frame to detect the above-mentioned repetition numbers. When the respective average luminance of two adjacent image frames are substantially the same, the detector 11 determines that the two adjacent image frames are two adjacent image frames having the same image data. When the respective average luminance of two adjacent image frames are different, the detector 11 determines that the two adjacent image frames are two adjacent image frames having different image data.

In some embodiments, the register 12 is a queue register or a first-in-first-out (FIFO) register, which includes storage units N1~N4. In the example shown in FIG. 2, the register 12 sequentially stores the numbers 2, 3, 3, 2 into storage units N1~N4. The number of storage units N1~N4 of the register 12 is illustrative only; the present disclosure is not limited thereto.

The data processor 13 configured to correspondingly adjust the image signal SV according to the repetition numbers detected by the detector 11. When the numbers 2, 3, 3, 2 are respectively stored in the storage units N1~N4, A1~A2, B1~B3, C1~C3 and D1~D2 respectively correspond to the number of the storage units N1~N4.

Figure 3:
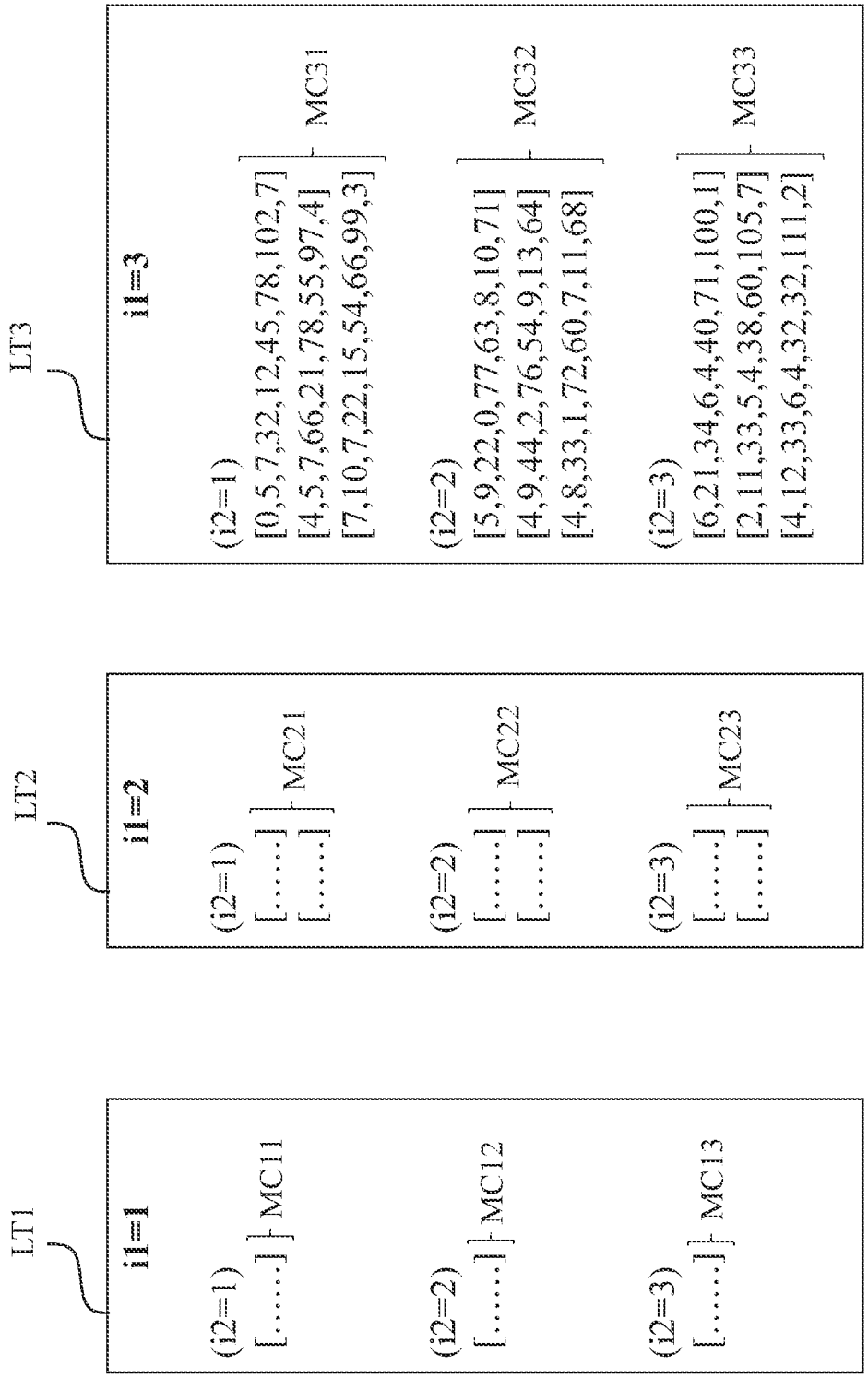
FIG. 3 is a schematic diagram illustrating a lookup table according to other embodiments of the present disclosure.

The data processor 13 adjusts A1~A2, B1~B3, C1~C3 and/or D1~D2 according to the numbers stored in the storage units N1~N4. The data processor 13 includes a memory 131, which is configured to store a plurality of lookup tables LT1~LT3 (refer to FIG. 3 concurrently), wherein the plurality of lookup tables LT1~LT3 are respectively configured to indicate a plurality sets of compensation calculations MC11~MC13, MC21~MC23, MC31~MC33. Each of the plurality of lookup tables LT1~LT3 respectively corresponds to different first index values i1, and each lookup table LT1~LT3 further corresponds to a plurality of different second index values i2. After the data processor 13 determines one of the plurality of lookup tables LT1~LT3 according to the numbers stored in the storage units N1~N4 and the plurality of first index values i1, the data processor 13 then determines one of the plurality of compensation calculations according to the plurality of second index values i2 of the determined lookup table, to adjust A1~A2, B1~B3, C1~3, and/or D1~D2.

In some embodiments, after the data processor 13 completes processing a certain set of repetitive image frames, the storage unit in the register 12 that stores the corresponding repetition number is erased. For example, after the data processor 13 completes processing A1~A2, the data stored in storage units N1 of the register 12 is erased.

Take the data processor 13 processing B1~B3 shown in FIG. 2 for example, in some embodiments, the data processor 13 determines which set of compensation calculation in which lookup table is used to process B1~B3 according to the numbers stored in the storage units N2 and N3. First, the repetition number corresponding to B1~B3 is 3 and is stored in the storage unis N2; after the data processor 13 reads the storage unit N2, the data processor 13 determines the lookup table LT3 having a first index value i1 of 3 as the lookup table to be used. Next, the data processor 13 reads the storage unit N3 (repetition number: 3) and processes B1~B3 using the compensation calculation MC33 corresponding to the second index values i2 of 3 in the lookup table LT3. In other words, the data processor 13 first determines the lookup table T3 corresponding to the first index value i1 that matches the number stored in the storage unit N2, and then determines the compensating calculation MC33 corresponding to the second index value i2 that matches the number stored in the storage unit N3.

In some embodiments, the compensation calculations MC11~MC13 are different from each another, compensation calculations MC21~MC23 are different from each another, and compensation calculations MC31~MC33 are different from each another. Different compensation calculations represent different image processing ways. The repetition number of B1~B3 is 3, and the repetition number of C1~C3 is 3; the data processor 13 selects compensation calculation MC33 in the lookup table LT3 to process B1~B3; and the repetition number of C1~C3 is 3, and the repetition number of D1~D2 is 2; the data processor 13 selects compensation calculation MC32 in the lookup table LT3 to process C1~C3. Because the repetition number of C1~C3 (3) differs from the repetition number of D1~D2 (2), the data processor 13 processes B1~B3 differently from processing C1~C3. In other words, the way that the data processor 13 process the image signal SV is related to the image frames having the same image data that are currently being processed and the image frames having the same repetition number that are going to be processed next.

In some embodiments, the number of lookup table LT1~LT3 stored in the memory 131 is limited, and hence, when the detected repetition numbers of image frames exceed a maximum index value in the plurality of first index values i1 (in the embodiment of FIG. 3, the maximum first index values i1 is 3), the data processor 13 uses the lookup table corresponding to the maximum index value in the plurality of first index values i1 (in the embodiment of FIG. 3, the lookup table LT3) to process the image frames.

In some embodiments, the number of compensation calculations included in each lookup table LT1~LT3 is limited, and hence, when the detected repetition numbers of image frames exceed a maximum index value of the plurality of second index values i2 (in the embodiment of FIG. 3, the maximum second index values i2 is 3), the data processor 13 uses the lookup table corresponding to the maximum index value in the plurality of second index values i2 (in the embodiment of FIG. 3, compensation calculations MC13, MC23, or MC33) to process the image frames.

In some embodiments, the data processor 13 processes B1, B2, and B3 according to the compensation calculation MC33. Referring back to FIG. 3, when the value of the first index values i1 is N, the corresponding plurality of compensation calculations respectively include N calculation coefficients. The data processor 13 is configured to use N calculation coefficients to process the image data of image frames received at N time points, respectively. For example, the data processor 13 uses three calculation coefficients of the compensation calculation MC33 to process B1, B2, B3 that are respectively received at 3 different time points.

In other embodiments, the data processor 13 only processes B3 according to compensation calculation MC33. In alternative embodiments, the data processor 13 only processes B2, B3 according to compensation calculation MC33.

Figure 4:
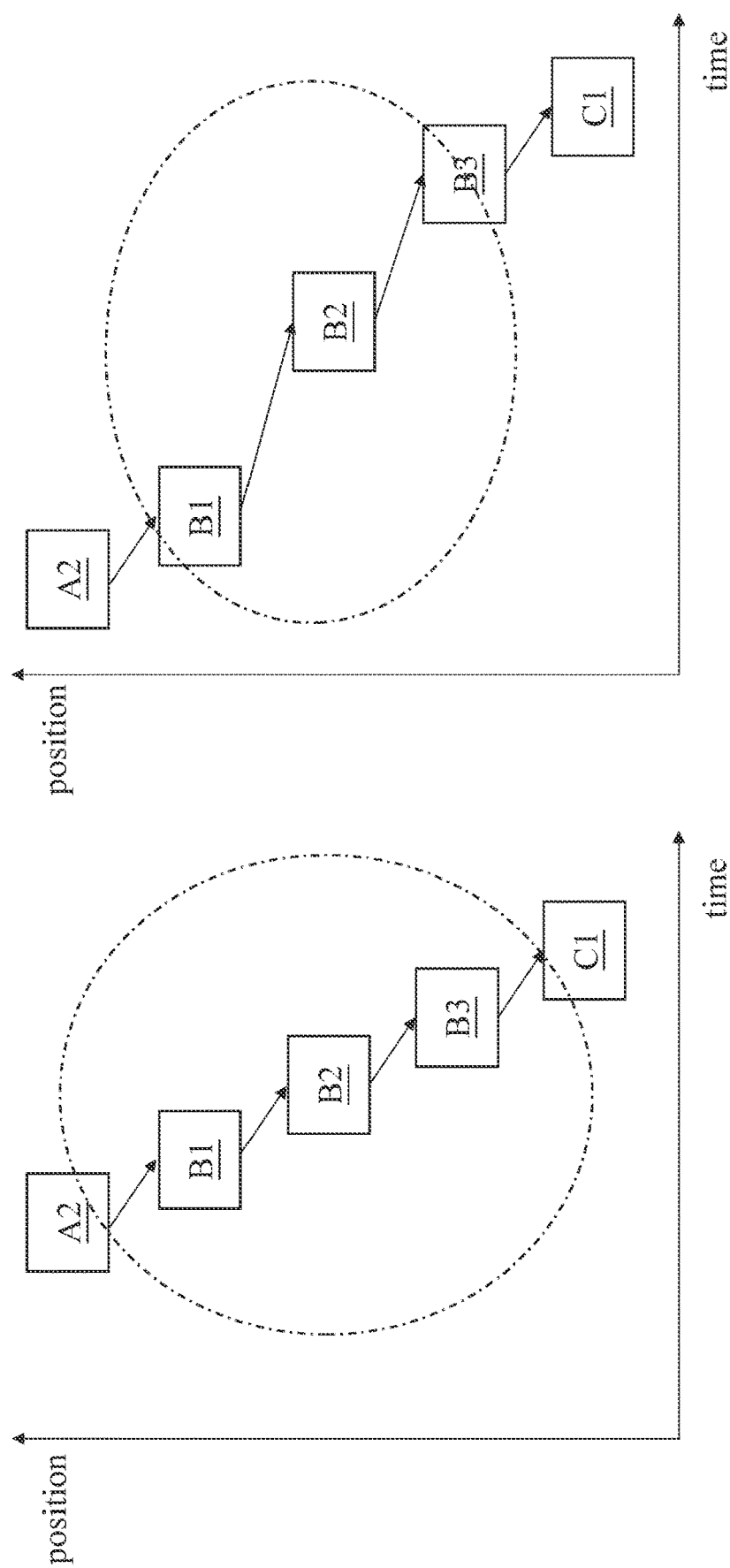
FIG. 4 is a time sequence diagram of image frame outputs according to other embodiments of the present disclosure.

In conventional arts, when the cadence of the image signal is known, the display system only provides a fixed adjustment method for the image signal, such as the operation of inserting frames. However, when the cadence of the image signal changes or is switched so frequently that it resembles a situation where there is no cadence, the display system still uses a fixed adjustment method to process the image signal. In this case, the processed image signal is likely to be overwritten by some frame data, and a situation of frame skipping occurs (for example, the situation shown in the dashed box in the right half of FIG. 4). Therefore, when viewing such a signal, there will be more jams or skipped frames.

Compared with the conventional arts, the embodiments of the present disclosure detect the repetition number of each image frame in the image signal SV, and then selects the corresponding compensation calculation to generate the compensated display signal SD according to the repetition number of each group of image frames with the same image data. Because the selected compensation calculation corresponds to the rapidly changing repetitions number in the detected image signal SV, the display signal SD is smoother and more continuous (such as the case shown in the left half of FIG. 4), with less jams and better viewing quality.

In other words, the image processing solution provided by the present application can treat the image frames with the same image data and appearing consecutively as a group of image frames and determine the lookup table related to the compensation calculation based on the number of repetitive image frames in the group of image frames. Next, the image processing solution provided by the present application may select a set of compensation calculations from the lookup table based on the number of repetitive image frames in another set of image frames immediately after the set of image frames and adjust the image data of at least one image frame in the set of image frames accordingly.

Figure 5:
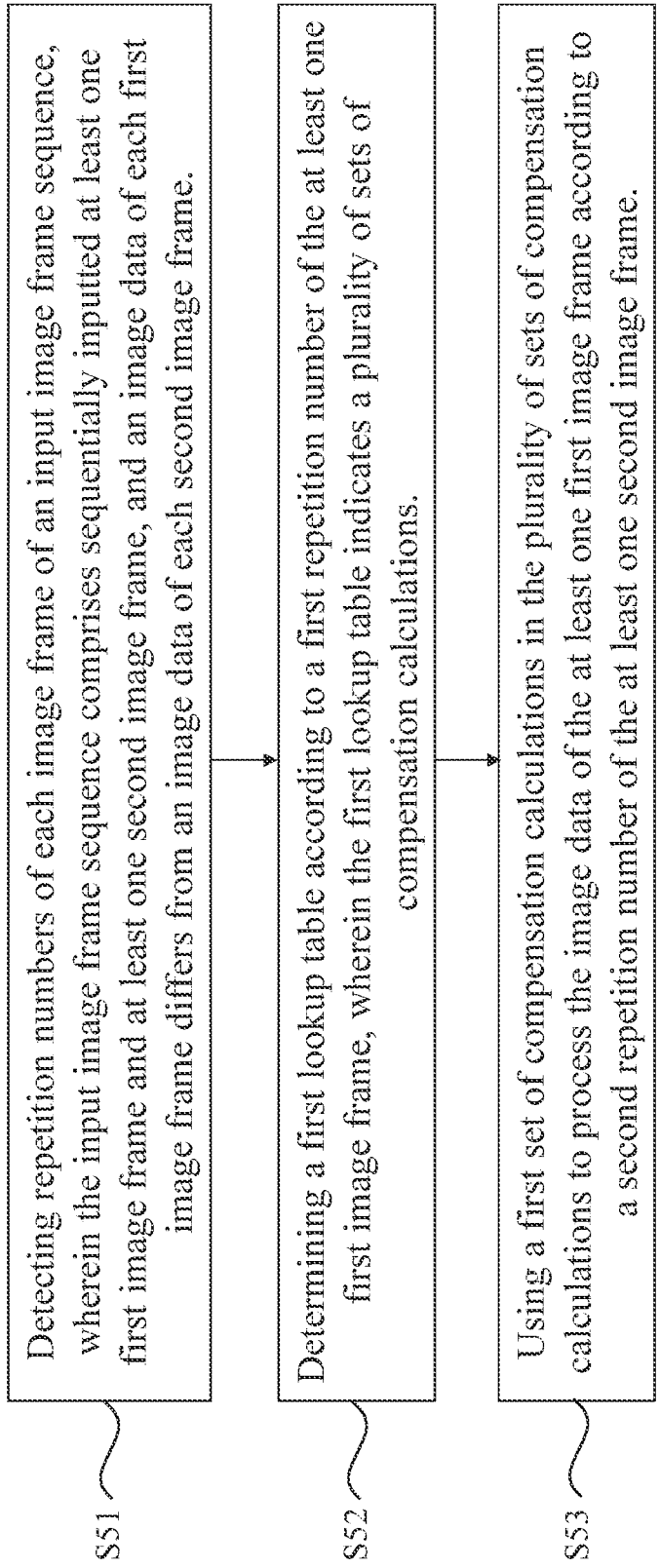
FIG. 5 is a flow chart illustrating an image processing method according to other embodiments of the present disclosure.

Reference is made to FIG. 5. FIG. 5 is a flow chart illustrating an image processing method 50 according to other embodiments of the present disclosure. In some embodiments, the image processing device 10 shown in FIG. 1 uses the image processing method 50 to process the image signal SV. More specifically, the image processing device 10 shown in FIG. 1 uses the image processing method 50 to improve the smoothness of the outputted display signal SD. The image processing method 50 includes Step S51, Step S52, and Step S53. For ease of understanding, the image processing method 50 is discussed below using the reference numerals discussed in FIG. 1~FIG. 3. Moreover, the image processing method 50 is not limited to Steps S51~S53 In further embodiments, the image processing method 50 may include the steps described through the image processing device 10 in FIG. 1 to FIG. 3 and the operation of the image processing device 10 described above.

In Step S51, repetition numbers of each image frame of input image frame sequence (A1~A2, B1~B3, C1~C3, D1~D2 as shown in FIG. 2) are detected, wherein the input image frame sequence includes sequentially inputted at least one first image frame (e.g., B1~B3) and at least one second image frame (e.g., C1~C3), the image data of each first image frame differs from the image data of each second image frame. In Step S52, a first lookup table (e.g., the lookup table LT3) is determined according to a first repetition number of the at least one first image frame, wherein the first lookup table indicates a plurality of sets of compensation calculations (e.g., MC31, MC32, MC33). In Step S53, a first set of compensation calculation (e.g., MC33) of the plurality of sets of compensation calculations is used to process the image data of the at least one first image frame according to a second repetition number of the at least one second image frame.

What is claimed is:

1. An image processing method, comprising:
receiving an input image frame sequence;
detecting a repetition number of each image frame of the input image frame sequence so as to determine a cadence of the input image frame sequence, wherein the input image frame sequence comprises a plurality of first image frames and a plurality of second image frames, and an image data of each first image frame differs from an image data of each second image frame, wherein the plurality of second image frames appear after the plurality of first image frames, wherein the plurality of first image frames are sequentially inputted, and the plurality of second image frames are sequentially inputted;
adjusting the plurality of first image frames according to a first repetition number of the plurality of first image frames and a second repetition number of the plurality of second image frames, so as to cause at least one interval between consecutive first image frames after the adjustment to be different from at least one interval between consecutive first image frames before the adjustment, wherein the first repetition number is equal to a number of the plurality of first image frames appearing consecutively, and the second repetition number is equal to a number of the plurality of second image frames appearing consecutively, wherein the first repetition number is different from the second repetition number; and
compensating for a change in the cadence by displaying the plurality of first image frames,
wherein each of the plurality of first image frames before the adjustment comprises a same image data, and each of the plurality of second image frames before the adjustment comprises a same image data.

2. The image processing method of claim 1, wherein the step of compensating for the change in the cadence comprises:
processing the image data of the image frame that is inputted last among the plurality of first image frames.

3. The image processing method of claim 1, further comprising:
providing a plurality of lookup tables, wherein the plurality of lookup tables respectively correspond to a plurality of first index values, wherein the plurality of first index values are different from each other; and
selecting a first lookup table from the plurality of lookup tables according to the first repetition number, wherein a first index value of the first lookup table matches the first repetition number.

4. The image processing method of claim 3, wherein the step of selecting the first lookup table from the plurality of lookup tables according to the first repetition number comprises:
when the first repetition number is a maximum index value among the plurality of first index values, selecting a lookup table corresponding to the maximum index value as the first lookup table.

5. The image processing method of claim 1, wherein the step of detecting the repetition number of each image frame of the input image frame sequence comprises:
sequentially measuring an average luminance of each image frame; and
determining whether two adjacent image frames are two adjacent image frames having the same image data according to the respective average luminance of every two adjacent image frames.

6. The image processing method of claim 5, wherein the step of determining whether the two adjacent image frames are two adjacent image frames having the same image data comprises:
determining that the two adjacent image frames are the same image frame that appear consecutively when the respective average luminance of the two adjacent image frames is the same.

7. The image processing method of claim 5, wherein the step of determining whether the two adjacent image frames are two adjacent image frames having the same image data comprises:
determining that the two adjacent image frames are two adjacent image frames having different image data when the respective average luminance of the two adjacent image frames is different.

8. The image processing method of claim 1, further comprising:
sequentially storing the first repetition number and the second repetition number in a register; and
erasing the first repetition number from the register after completing the step of displaying the plurality of first image frames.

9. An image processing device, comprising:
an image detector, configured to detect a repetition number of each image frame of an input image frame sequence so as to determine a cadence of the input image frame sequence, wherein the input image frame sequence comprises a plurality of first image frames and a plurality of second image frames, and an image data of each first image frame differs from an image data of each second image frame, wherein the plurality of second image frames appear after the plurality of first image frames;
a data processor, configured to adjust the plurality of first image frames according to a first repetition number of the plurality of first image frames and a second repetition number of the at least one second image frame appearing after the plurality of first image frames, so as to cause at least one interval between consecutive first image frames after the adjustment to be different from at least one interval between consecutive first image frames before the adjustment, wherein the first repetition number is equal to a number of the plurality of first image frames appearing consecutively, and the second repetition number is equal to a number of the plurality of second image frames appearing consecutively; and
a display,
the data processor is further configured to:
compensate for a change in the cadence by displaying, by the display, the plurality of first image frames,
wherein each of the plurality of first image frames before the adjustment comprises a same image data, and each of the plurality of second image frames before the adjustment comprises a same image data.

10. The image processing device of claim 9, wherein the data processor is further configured to process the image data of the image frame that is last inputted among the plurality of first image frames.

11. The image processing device of claim 9, wherein
the data processor comprises a memory, configured to store a plurality of lookup tables, wherein the plurality of lookup tables respectively correspond to a plurality of first index values, wherein the plurality of first index values are different from each other, and
the data processor is further configured to select a first lookup table from the plurality of lookup tables according to the first repetition number, wherein a first index value of the first lookup table matches the first repetition number.

12. The image processing device of claim 11, wherein when the first repetition number is a maximum index value among the plurality of first index values, the data processor is configured to select a lookup table corresponding to the maximum index value as the first lookup table.

13. The image processing device of claim 9, wherein the image detector is further configured to sequentially measure an average luminance of each image frame and determine whether two adjacent image frames are two adjacent image frames having the same image data according to the respective average luminance of every two adjacent image frames.

14. The image processing device of claim 13, wherein the image detector determines that the two adjacent image frames are the same image frame that appear consecutively when the respective average luminance of the two adjacent image frames is the same.

15. The image processing device of claim 13, wherein the image detector determines that the two adjacent image frames are two adjacent image frames having different image data when the respective average luminance of the two adjacent image frames is different.

16. The image processing device of claim 9, further comprising:
a register, configured to sequentially store the first repetition number and the second repetition number and erase the first repetition number from the register after displaying the plurality of first image frames.

* * * * *